US008878537B1

(12) United States Patent
Johnson et al.

(10) Patent No.: US 8,878,537 B1
(45) Date of Patent: Nov. 4, 2014

(54) METHOD AND APPARATUS TO MINIMIZE GRADIENT ERRORS IN BURIED UTILITY DEPTH MEASUREMENTS (75) Inventors: David Eugene Johnson, El Paso, TX (US); Ross Edward Spain, Clovis, CA (US)

(73) Assignee: First Texas Products, LLC, El Paso, TX (US)

( * ) Notice: Subject to any disclaimer, the term of this patent is extended or adjusted under 35 U.S.C. 154(b) by 488 days.

(21) Appl. No.: 13/152,959

(22) Filed: Jun. 3, 2011

(51) Int. Cl.
*G01V 3/08* (2006.01)

(52) U.S. Cl.
USPC ............................................. 324/326; 324/67

(58) Field of Classification Search
CPC ....................................................... G01V 3/08
USPC ..................................................... 324/326, 67
See application file for complete search history.

(56) References Cited

U.S. PATENT DOCUMENTS

| | | | |
|---|---|---|---|
| 1,526,391 A | | 2/1925 | Stewart |
| 3,617,865 A * | | 11/1971 | Hakata ........................... 324/326 |
| 3,893,025 A | | 7/1975 | Humphreys, Jr. |
| 3,988,663 A | | 10/1976 | Slough et al. |
| 4,387,340 A | | 6/1983 | Peterman |
| 4,672,321 A | | 6/1987 | Howell |
| 5,065,098 A | | 11/1991 | Salsman et al. |
| 5,093,622 A | | 3/1992 | Balkman |
| 5,231,355 A | | 7/1993 | Rider et al. |
| 5,920,194 A * | | 7/1999 | Lewis et al. ................... 324/326 |
| 5,990,682 A | | 11/1999 | Mercer |
| 6,130,539 A | | 10/2000 | Polak |

OTHER PUBLICATIONS

Radiodetection Ltd., "abc & xyz of locating buried pipes and cables for the beginner and the specialist", copyright 1994, 168 pages.
Barry Clegg, "Underground Cable Fault Location"; Chapter 6, copyright 1993, pp. 169-191.
Howard W. Sams & Co., "Reference Data for Engineers: Radio, Electronics, Computer and Communications" 7th ed., 1985, pp. 10-7 & 10-8.

* cited by examiner

*Primary Examiner* — Reena Aurora
(74) *Attorney, Agent, or Firm* — Faegre Baker Daniels LLP (57) ABSTRACT A buried utility locator uses the "gradient method" to determine the depth of a buried, current-carrying utility. The method and corresponding apparatus used in said locator, to minimize field gradient measurement errors, includes first and second antennas. Both the first and second antennas are mounted along a common vertical axis inside the locator's housing. The first antenna is a gradiometer formed by two vertically spaced-apart magnetic field sensors connected in a differential configuration. The second antenna provides a secondary field measurement along the direction of the gradient sensor axes.

20 Claims, 8 Drawing Sheets

FIG. 1A

Prior Art

METHOD AND APPARATUS TO MINIMIZE GRADIENT ERRORS IN BURIED UTILITY DEPTH MEASUREMENTS

BACKGROUND AND SUMMARY

Embodiments of the present disclosure relate to instruments used to locate underground conductive objects such as pipes, cables, and subsurface field generators. The present disclosure is related in particular to those instruments capable of measuring the underground depth of such objects.

Construction contractors and public utility companies commonly use instruments known as "depth-reading line tracers" and "pipe and cable locators" to locate and determine the depth and orientation of buried electrically conductive utilities. The terms "locator" and "instrument" are used interchangeably herein to refer to such instruments. In typical usage, a separate transmitter unit is employed to inject an AC signal current into the utility, thus "energizing" it. This signal current is typically within the frequency range of several hundred Hz to several hundred KHz and sets up a magnetic field around the utility for the locator to sense above ground. Location, orientation and depth of the buried utility are then signaled by visual and/or audible indicators according to the locator's design.

Figure 1A:
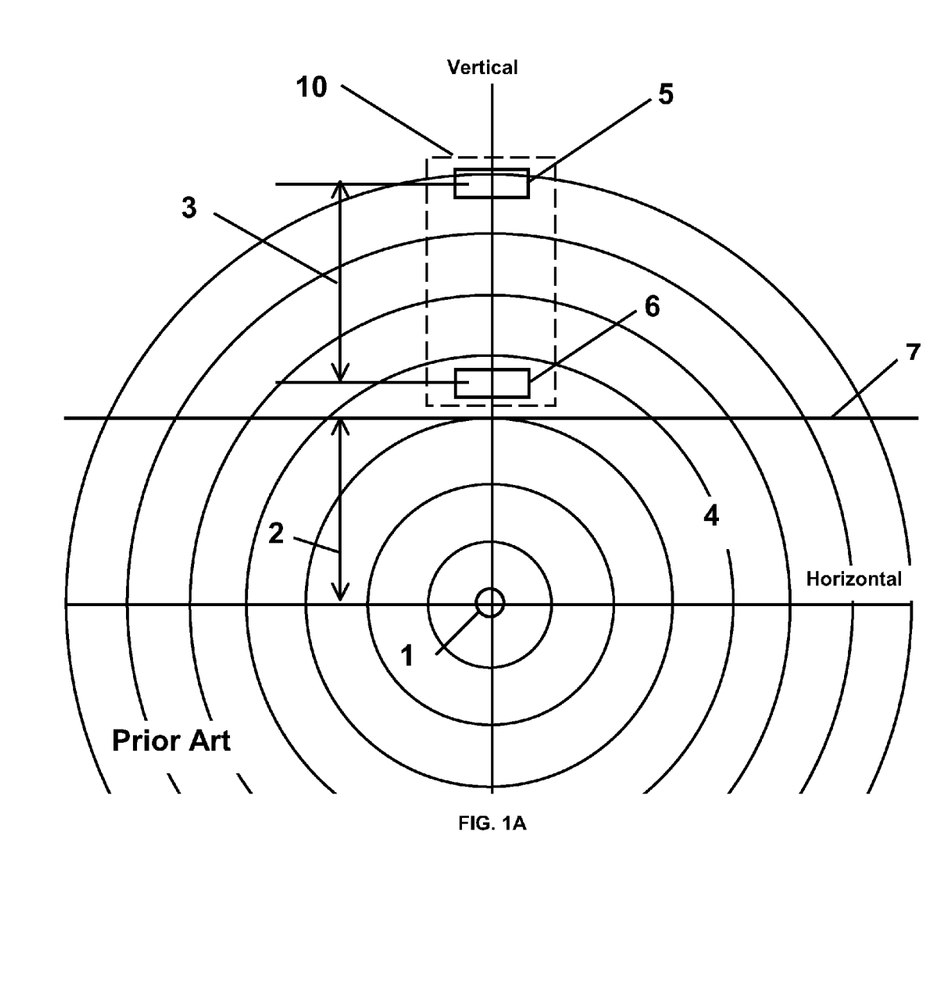
FIG. 1A is a diagrammatical view of a prior art sensing apparatus located above an energized utility.

For design purposes, those skilled in the art typically model the magnetic field set up by the energizing current as emanating circular field lines, concentric to the utility. The field strength is inversely proportional to the radial distance from the utility, in accordance with a theoretical field set up by an infinitely long, straight-line conductor. FIG. 1A shows such an exemplary field model 4, emanating from a utility 1, buried at depth 2 under ground level 7. Using the geometric relationships of this circular field model 4 and similar variations of it, designers have devised a number of depth-reading instruments that operate by deriving depth information from measurements taken of the field at multiple locations.

Of particular relevance to the present disclosure is the category of depth reading instruments that operate according to what is commonly known as the "gradient method". With reference to FIG. 1A, such instruments typically employ a sensor array 10, comprised of an upper sensor 5 and lower sensor 6 which are vertically spaced apart by a fixed distance 3 to measure the magnetic field at their respective vertical positions above the utility. Signals from these sensors 5, 6 are subsequently fed through cables to circuitry (not shown) for further conditioning, processing and computation to determine a depth measurement for the utility 1, which is then presented to the operator. U.S. Pat. No. 4,387,340 and the publication "abc & xyz of locating buried pipes and cables for the beginner and the specialist" by Radiodetection Corp. (1994), both of which are incorporated herein by reference, describe the fundamental operation of such instruments.

Using the geometric properties of the concentric field model described above, and under the conditions that the sensor array is located directly over the buried utility and the lowest sensor is at ground-level, they derive an equation expressing the depth of the buried utility as the product of the spacing between the upper and lower sensors 5, 6 and the ratio of the upper field sensor voltage to the gradient voltage formed by the difference between the lower and upper field sensor voltages. In practice, the spacing between upper and lower sensors 5, 6 is commonly equal to approximately 1 ft. and additional calibration factors and constants are included to compensate for various measurement irregularities and errors.

Conventional locators use sensitive circuitry which is prone to time and temperature drift making depth measurement accuracy a fundamental design challenge. Such drift errors are particularly critical in the formation of the gradient signal used in the depth computation. This gradient signal is formed apart from the signal sources, using two separate signals, whose respective sensor, resonant antenna network, and processing channel errors all contribute to the total gradient error. The location where this difference signal is formed varies according to design. In some instruments, it is formed in the analog circuitry as described in U.S. Pat. Nos. 5,065,098 and 5,231,355, for example. In other instruments, it is computed by an embedded microprocessor after suitable analog signal conditioning, as described in U.S. Pat. No. 4,672,321, for example. The '098, '355, and '321 patents are incorporated herein by reference.

Two basic approaches are used to minimize the aforementioned gradient errors. The first approach is to pay close attention to time and temperature stability issues, with the goal that over time, such differential mismatches will not exceed a fraction of a percent. Such goal is difficult to achieve, however, under the variety of environmental conditions encountered in actual field use over time. In addition, costs associated with product development, use of premium components, and specialized fabrication techniques become prohibitive at some point.

The second approach to minimizing gradient errors multiplexes each sensor's output signal sequentially in time to a shared processing channel. A goal of the second approach is to cancel and minimize errors common to the shared channel. The locator described in U.S. Pat. No. 4,387,340, for example, is typical of those using such an approach. The '340 patent is incorporated herein by reference. Although somewhat more effective than the first approach, the second approach fails to remedy potential errors and mismatches arising from high-Q resonant networks and the sensors themselves. In addition, such time-multiplexed approaches require more time during the measurement process, causing the instrument to respond in a "sluggish" manner. Furthermore, such techniques make the instrument vulnerable to errors resulting from changing conditions during the measurement process.

The present disclosure provides a method and corresponding apparatus used in a locator to measure the depth of buried, current-carrying utilities and subsurface field generators. The present system and method improves the accuracy of such depth measurements by minimizing errors in the field gradient measurement, which is used in the computation of depth and in accordance with the aforementioned "gradient method".

In an illustrated embodiment of the present disclosure, a direct magnetic field gradient signal and parallel secondary field signal are used in the computation of the depth of the utility. Also in accordance with an illustrated embodiment of the present disclosure, signals are provided by an apparatus, which includes first and second antennas, both rigidly mounted along a common vertical axis inside the locator's housing. The first antenna is a gradiometer formed by two vertically spaced-apart magnetic field sensors. Such sensors are typically spaced apart in the range of 8-20 inches, and are connected in a subtraction configuration to provide a difference signal representative of the field gradient. The second antenna is a single magnetic field sensor located along the same common vertical axis and is aligned in parallel to the gradient sensors. This sensor provides a signal representative of the magnetic field at a point along the axis for use in the depth equation. The direct gradient and secondary signals from the apparatus are sent to circuitry for suitable filtering, amplification and conversion before being processed by an embedded microprocessor. Computation results from the microprocessor are subsequently provided to the operator by electronic means via a display or speaker, for example.

Additional features of the present system and method will become apparent to those skilled in the art upon consideration of the following detailed description of illustrative embodiments exemplifying the best mode of carrying out the present system and method as presently perceived.

BRIEF DESCRIPTION OF THE DRAWINGS

The above-mentioned and other features of this disclosure, and the manner of attaining them, will become more apparent and the disclosure itself will be better understood by reference to the following description of illustrated embodiments taken in conjunction with the accompanying drawings, wherein.

DETAILED DESCRIPTION OF THE DRAWINGS

For the purposes of promoting an understanding of the principles of the present disclosure, reference will now be made to the embodiments illustrated in the drawings, which are described below. The embodiments disclosed below are not intended to be exhaustive or limit the present system to the precise form disclosed in the following detailed description. Rather, the embodiments are chosen and described so that others skilled in the art may utilize their teachings. Therefore, no limitation of the scope of the claimed present system or method is thereby intended. The present system and method includes any alterations and further modifications of the illustrated devices and described methods and further applications of the principles of the present disclosure which would normally occur to one skilled in the art. Corresponding reference numbers in the drawings indicate corresponding parts throughout several views.

As previously stated, the system and method of the present disclosure uses a directly sensed gradient signal in the computation of the depth of an underground object. This direct gradient signal has fewer errors associated with it than prior art methods, which derive their gradient signal from two or more separately processed signals. One way to illustrate the superiority of the present invention over prior art is to apply a first-order sensitivity analysis. When applied to the processed signals used to form the gradient signal in each system's depth equation, a measure of each system's depth sensitivity to a small error change in one of the signals is made available for comparison. Block diagrams illustrating the flow of signals used in the formation of gradient signals, and the error sources present, are presented along with corresponding depth equations.

Figure 2:
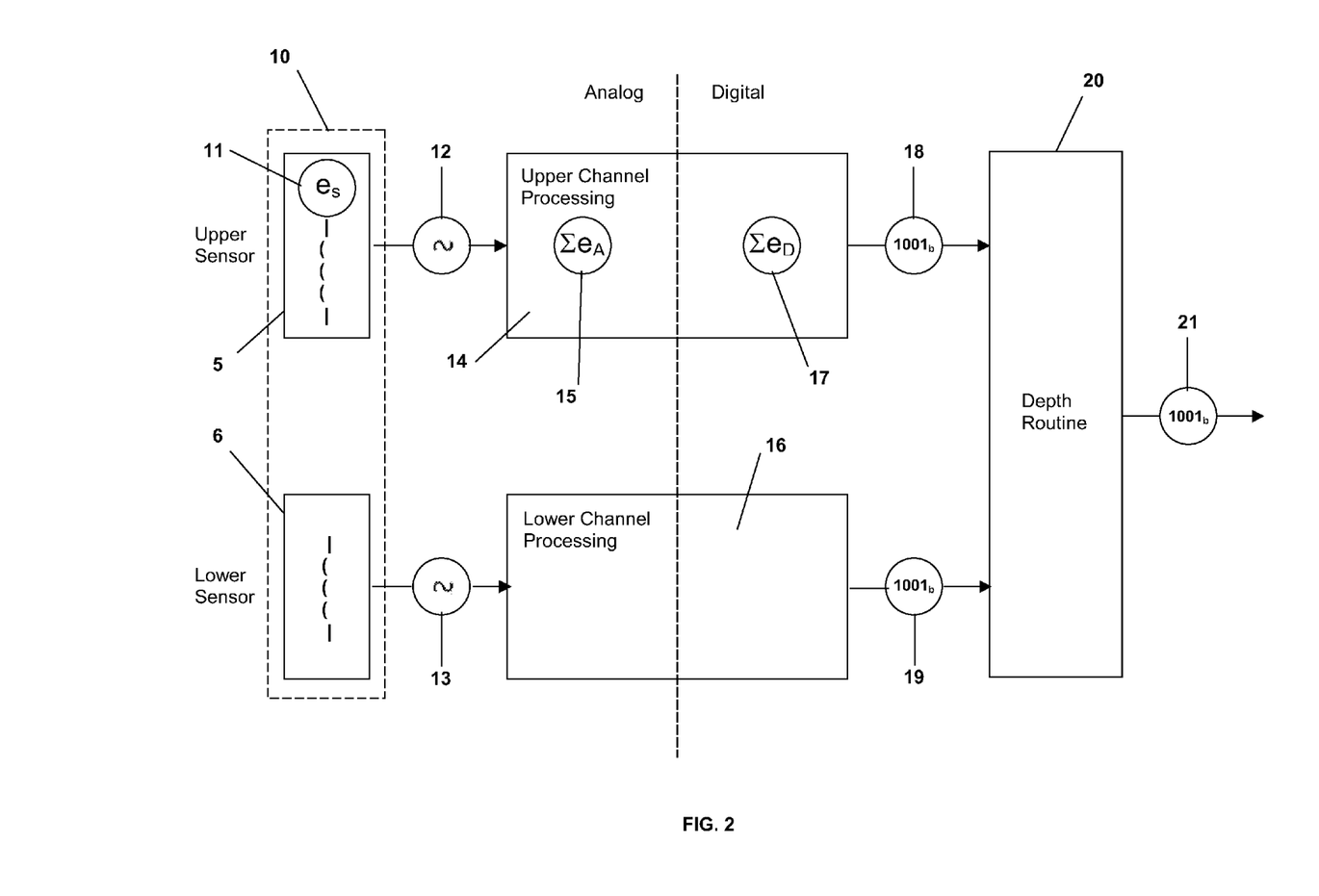
FIG. 2 is a block diagram showing the signal flow of a typical prior art system.
Figure 3:
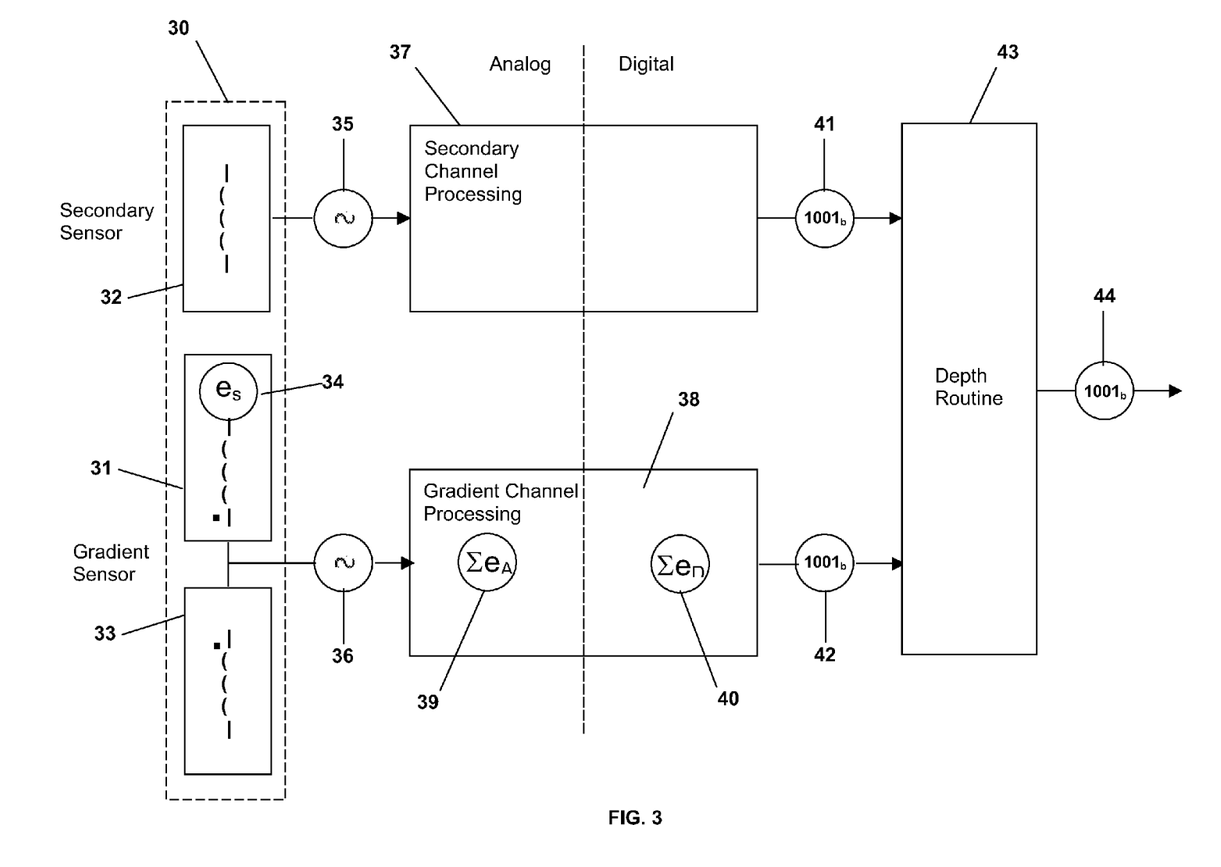
FIG. 3 is a block diagram showing the signal flow of one embodiment of the present disclosure.
Figure 4:
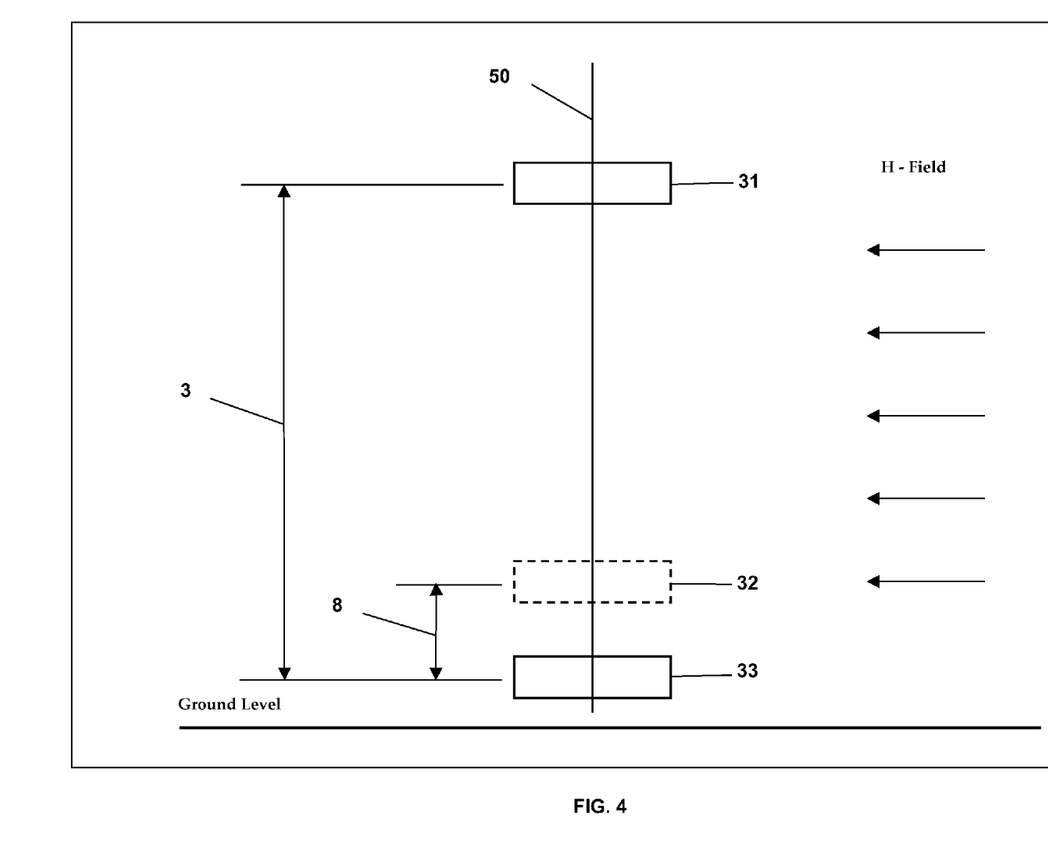
FIG. 4 is a generalized diagrammatical view of the sensing apparatus of the present disclosure showing possible secondary sensor placement locations.
Figure 5:
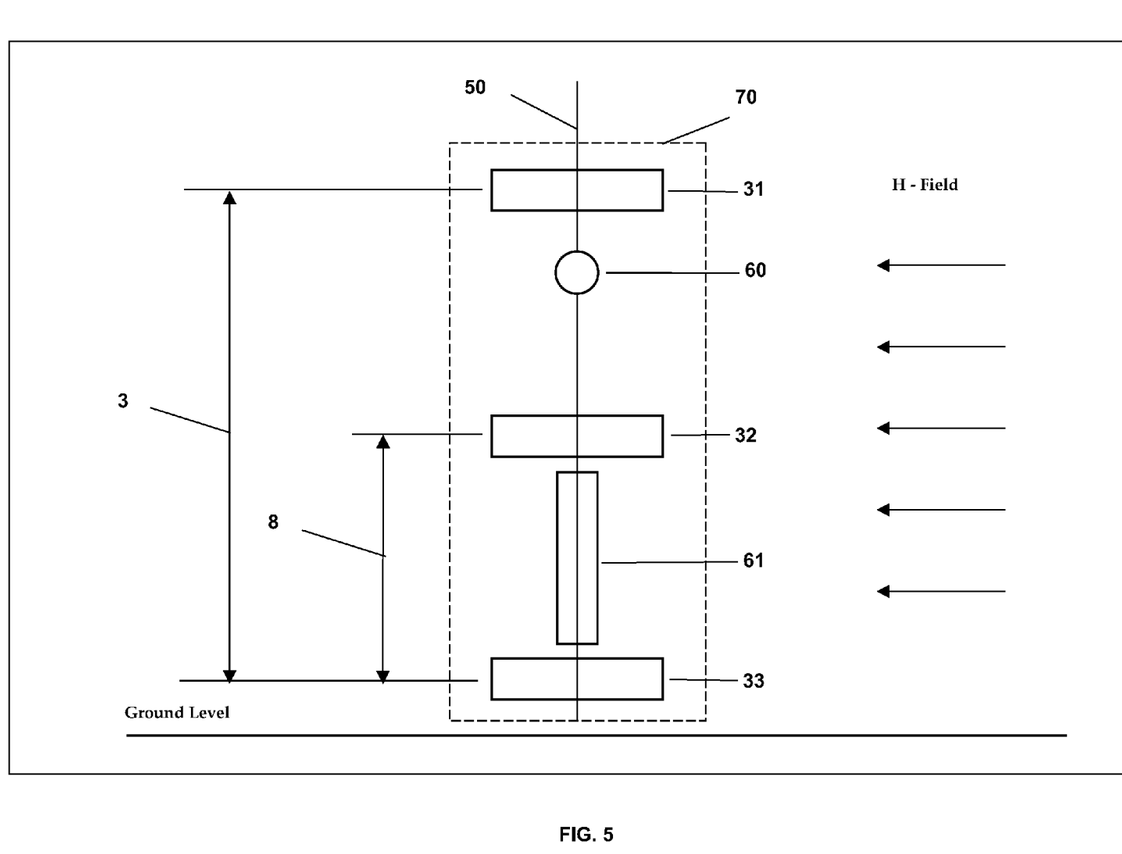
FIG. 5 is a diagrammatical view of another embodiment of the present disclosure with the addition of different functioning sensors.
Figure 6:
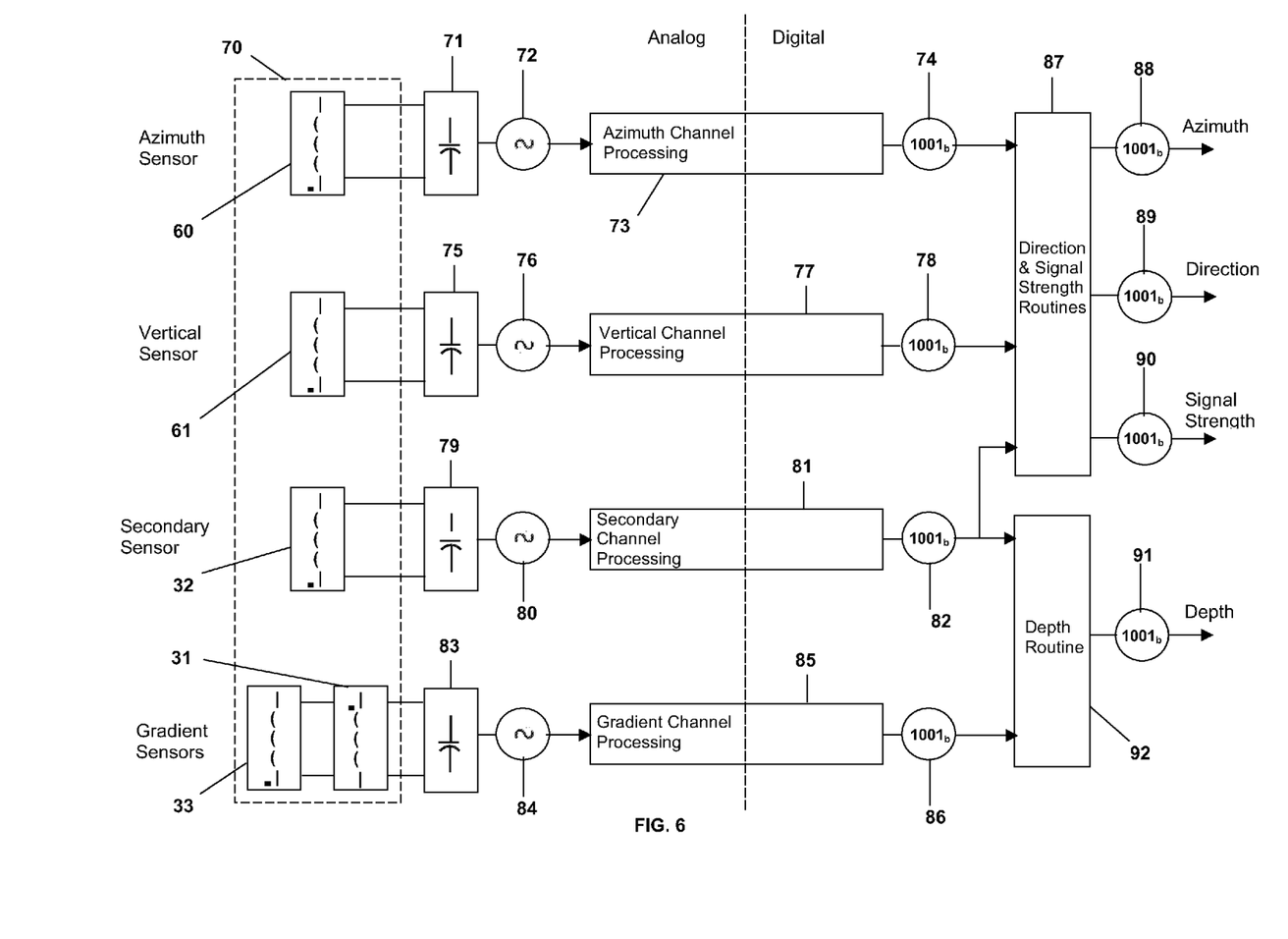
FIG. 6 is a block diagram showing the signal flow of an illustrated embodiment of the present disclosure.

A typical prior art system is shown in FIG. 2. An illustrated equivalent embodiment of the present disclosure is shown in FIG. 3. A first-order sensitivity analysis is applied to both systems and the results are compared. A generalized view of the present disclosure is discussed herein according to the diagram in FIG. 4, and a description of an illustrated preferred embodiment of the present disclosure is shown in FIG. 5 and FIG. 6.

FIG. 2 illustrates a typical prior art system using the previously described sensor array 10 of FIG. 1A, and various analog and digital signal processing blocks. Upper magnetic field sensor 5 produces signal 12, which may be a current or voltage. Signal 12 flows to a processing channel 14, which includes both analog and digital stages of signal processing. Functions commonly included within such processing channels include a resonant network block directly connected to the sensor 5, various analog amplification, filtering, and conversion blocks, channel multiplexing, analog-to-digital conversion, and various digital signal-processing blocks. The output of processing channel 14 is digital number 18, which is a representation of the processed upper sensor signal 12. In likewise manner, lower magnetic field sensor 6 produces signal 13, which flows through similar processing channel 16, and outputs digital number 19, which is illustratively a digital number representation of processed lower sensor signal 13. A depth routine 20 receives upper and lower digital numbers 18 and 19, respectively, as inputs and computes digital number 21, which represents the depth of the buried utility 1. In accordance with the previously described gradient method depth equation, depth routine 20 illustratively uses the following mathematical equation:

$$D = K\left(\frac{N_U}{N_L - N_U}\right) \quad \text{(Equation 1)}$$

where:
D=depth of utility 1, where depth is defined as the vertical distance from the buried utility 1 to the lower field sensor 6.
K=the vertical distance between the upper and lower field sensors 5, 6.
$N_U$=upper sensor digital number 18
$N_L$=lower sensor digital number 19

For purposes of gradient error analysis, all error sources contributing to differential errors between the upper and lower sensors 5, 6 and channels 14, 16 are transferred to the upper sensor 5 and upper channel 14. These sources are shown as errors 11, 15, and 17 in FIG. 2, which represent the total sum of differential errors present in their respective locations. Common-mode errors are assumed to cancel out in the subtraction process and are not considered. Errors in source 11 include those arising from sensor misalignment within the apparatus and other electronic and physical mismatches between the sensors 5, 6. Errors in source 15 include those arising from time and temperature drift of circuitry in the analog processing blocks of channels 14 and 16. Errors in source 17 include quantization and conversion errors occurring in the digital processing blocks of channels 14 and 16.

Figure 1B:
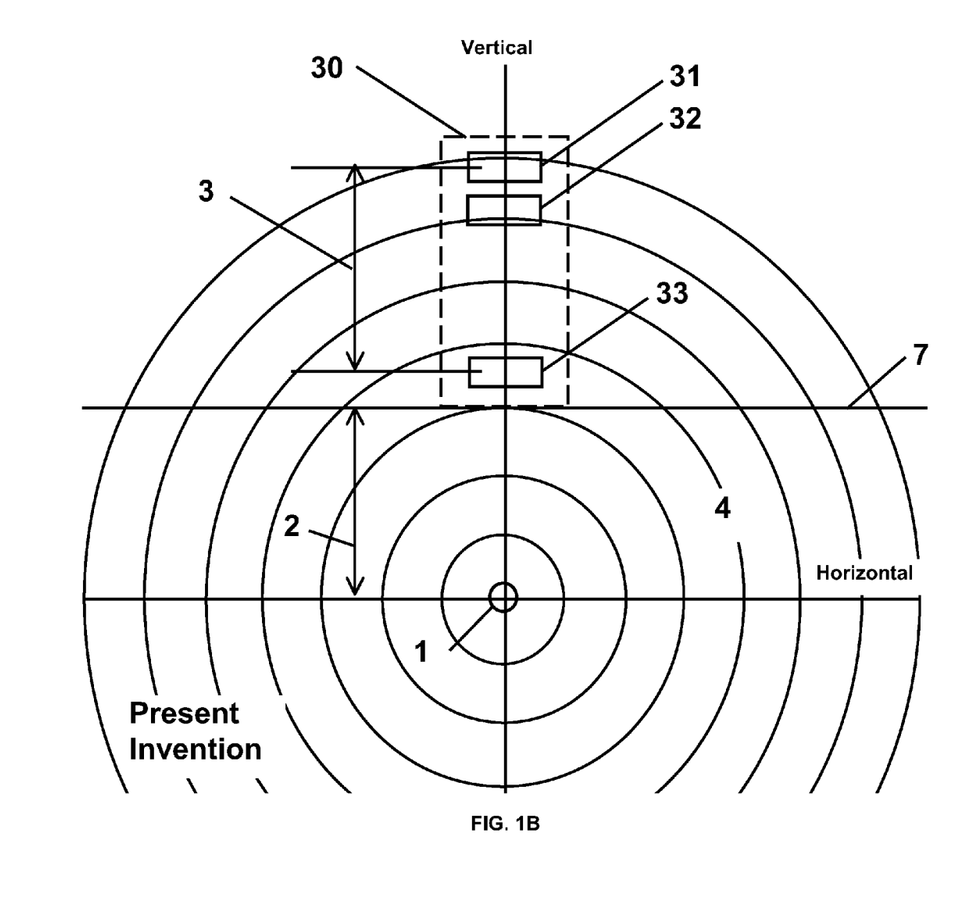
FIG. 1B is a diagrammatical view of one embodiment of a sensing apparatus of the present disclosure located above an energized utility.

FIG. 3 illustrates a system embodiment of the present disclosure which is similar to prior art for comparison. This embodiment uses an improved sensor array 30 as discussed above with reference to FIG. 1B. Sensor array 30 includes a gradiometer formed by upper and lower sensors 31 and 33 respectively, which are vertically spaced apart by distance 3, and secondary sensor 32 which is in close proximity to and functions as a proxy for upper sensor 31 in isolation. Referring again to FIG. 3, secondary sensor 32 produces signal 35, which flows to analog and digital processing channel 37. The output of processing channel 37 is digital number 41, which represents the processed secondary signal 35. In similar manner, the gradiometer, formed by upper and lower magnetic field sensors 31 and 33 respectively, produces a difference signal or gradient signal 36, which flows through a similar gradient processing channel 38, which outputs a digital number 42. Digital number 42 represents the processed gradient signal 36. A depth routine 43 receives secondary number 41 and gradient number 42 as inputs and computes a digital number 44 which represents the depth of the buried utility 1. Substituting digital gradient number 42 for the difference number formed by $N_L-N_U$, and substituting processed secondary digital number 41 for processed upper digital number 18 in Equation 1, the equation is transformed to:

$$D = K\left(\frac{N_S}{N_G}\right) \quad \text{(Equation 2)}$$

where:
D=depth of utility 1, where depth is defined as the vertical distance from the buried utility 1 to the lower field gradient sensor 33.
K=the vertical distance between the upper and lower gradient sensors 31, 33.
$N_G$=gradient sensor digital number 42
$N_S$=secondary sensor digital number 41

Error sources in the gradient channel 38 are shown as errors 34, 39, and 40 in FIG. 3. These errors again represent the total sum of errors present at their respective locations. Error source 34 represents the same type of differential sensor errors described for error source 11 in FIG. 2. Error sources 39 and 40 contain the same error types described for error sources 15 and 17, respectively, except no distinction is made between differential and common-mode errors for channel 38.

Sensitivity Analysis

A description of classical sensitivity theory and its application is shown in an article entitled "Reference Data for Engineers", $7^{th}$ ed., pp. 10-7 and 10-8, which is incorporated herein by reference. In accordance with such classical sensitivity theory, the single-parameter small-change sensitivity, $S_x^y$, is a measure that indicates the percentage deviation of a response (y) to a percentage variation of one of its parameters (x). Expressed mathematically:

$$S_x^y=(dy/y)/(dx/x)=(dy/dx)*(x/y) \quad \text{(Equation 3)}$$

Referring to FIG. 2, variations in upper channel number 18 ($N_U$ in Equation 1), which cause corresponding variations in depth measurement number 21 (D in Equation 1), result from the total sum of differential errors sources 11, 15, and 17. Using sensitivity Equation 3 to operate on depth Equation 1, the depth sensitivity of the prior art system is shown to be:

$$S_U^D=1+D/K \quad \text{(Result 1)}$$

Where:
D=depth of utility 1
K=the vertical distance between the upper and lower field sensors 5, 6.

Referring to FIG. 3, variations in gradient channel number 42 ($N_G$ in Equation 2), which cause corresponding variations in depth measurement number 44 (D in Equation 2), result from the total sum of differential error sources 34, 39, and 40. Using sensitivity Equation 3 to operate on depth Equation 2, the depth sensitivity of the system of the present disclosure is shown to be:

$$S_G^D=-1 \quad \text{(Result 2)}$$

What Results 1 and 2 show is that sensitivity to gradient error variations is greater in the prior art system than in the system of the present disclosure due to the additional D/K term in Result 1. By way of numerical example, consider the case of a utility buried 9 ft. underground, vertical sensor spacing of 1 ft., and 1% error variation occurring within both systems. Such error variation would cause a 10% depth measurement error in the prior art system as opposed to only a 1% error in the present system.

Exemplary Embodiments

As previously stated, the improved apparatus of the present disclosure includes first and second antennas, both rigidly mounted along a common vertical axis inside the locator's housing. FIG. 4 shows an illustrative generalized layout of this apparatus along a vertical axis 50, as it is mounted inside of a locator. Connecting cables, processing electronics, mounting hardware, and enclosure of the locator are not shown in FIG. 4.

The first antenna is a gradiometer formed by identical upper and lower magnetic field sensors 31 and 33 respectively. Such sensors are spaced apart by a distance 3 from each other and along vertical axis 50 of the locator, to measure the field gradient along this axis. Distance 3 is typically one ft., but may vary depending on performance requirements. These sensors 31, 33 are connected differentially in parallel or series and oriented accordingly with respect to polarity to provide a direct magnetic field gradient signal or difference between their outputs of sensors. Such connections are located at any convenient location within the housing of the locator.

The second antenna consists of one magnetic field sensor shown as dashed box 32 spaced vertical distance 8 away from lower gradient sensor 33 in FIG. 4. This sensor 32 senses the magnetic field along the same direction as the gradient sensors 31, 33 and provides a secondary signal needed for the depth computation. Though shown near gradient sensor 33, it can be located anywhere along axis 50. The exact position is ultimately determined by factors including performance specifications, sensor properties, space constraints, and cost. "Crosstalk" occurring by mutual magnetic coupling between sensors sets a practical limit as to how close secondary sensor 32 can be located to either of the gradient sensors 31 and 33.

Through algebraic manipulation of secondary digital number 41 and gradient digital number 42 in FIG. 3, a generalized depth equation is derived which expresses depth for any location along vertical axis 50, that secondary sensor 32 lies in FIG. 4. This equation is given as:

$$D = \frac{1}{2}\left[K\left(\frac{N_S}{N_G}-1\right) + \sqrt{K^2\left(\frac{N_S}{N_G}-1\right)^2 + 4KW\left(\frac{N_S}{N_G}\right)}\right] \quad \text{(Equation 4)}$$

where:
- D=depth of utility 1, where depth is defined as the vertical distance from the buried utility 1 to the lower field gradient sensor 33.
- K=the vertical distance between the upper and lower gradient sensors 31 and 33.
- W=the vertical distance between secondary sensor 32 and lower gradient sensor 33.
- $N_S$=secondary digital number 41
- $N_G$=gradient digital number 42

It can be seen that when secondary sensor 32 is co-located with upper gradient sensor 31, parameter W equals parameter K in Equation 4 and the equation reduces to previously stated Equation 2.

FIG. 5 illustrates a preferred embodiment of the present disclosure similar to FIG. 4 with connecting cables, processing electronics, mounting hardware, and the locator housing not being shown. Sensor array 70 includes a gradient antenna formed by upper and lower gradient sensors 31 and 33, respectively, and second antenna formed by secondary sensor 32. Added to the apparatus of FIG. 5 is an azimuthally aligned sensor 60, which senses field components perpendicular to its vertical and horizontal axes, to provide azimuth direction information related to the utility. Also added is a vertically aligned sensor 61, which senses vertical field components, to provide transverse location information. All sensors are rigidly mounted along the vertical axis 50 of the apparatus.

FIG. 6 shows a partial system block diagram of an illustrated embodiment using the apparatus described in FIG. 5. Referring to FIG. 6, sensors 31, 32, 33, 60 and 61 are all illustratively inductive ferrite core type sensors that are matched to within 1%, having polarities shown by the dot indicators. Gradiometer sensors 31 and 33 are connected in a parallel-opposing configuration, which allows for both sensor's outer windings to be connected to ground for enhanced electrostatic shielding. In the diagram of FIG. 6, capacitors 71, 75 and 79, are matched to within a small percentage, and are connected in parallel to each of their associated sensors 60, 61, and 32, respectively, to form parallel resonant networks. Since the parallel gradiometer antenna inductance is half the value of a single sensor, its resonating capacitor 83 is twice the value of the other sensor's resonating capacitors 71, 75 and 79.

The resonant networks produce analog signal voltages 72, 76, 80 and 84 which are sent to closely matched parallel analog and digital processing channels 73, 77, 81 and 85, respectively. These channels 73, 77, 81 and 85 are similar in form and function to those described in FIG. 2 and FIG. 3. The output from processing channel 73 is digital number 74, which is a representation of the processed azimuth signal 72. The output from processing channel 77 is digital number 78, which is a representation of the processed vertical signal 76. The output from processing channel 81 is digital number 82, which is a representation of the processed secondary signal 80. The output from processing channel 85 is digital number 86, which is a representation of the processed gradiometer signal 84.

Depth routine 92 receives as inputs the secondary number 82 and gradiometer number 86 and computes a digital number 91, which represents the depth of the buried utility 1. The Direction and Signal Strength routines at block 87, receive as inputs digital azimuth number 74, digital vertical number 78 and digital secondary number 82 to compute a digital number 88 which represents the azimuth direction of the utility, digital number 89 which represents the transversal location of the utility, and digital number 90 which represents the relative strength of the magnetic field. It will be noted that computational methods for utilizing vertical, azimuth and secondary numbers 78, 74 and 82 respectively, to compute directional and signal strength information for display to the user, are familiar to those skilled in the art. Digital numbers 88, 89, 90, and 91 are sent for further processing and subsequent display, on the locator.

Figure 7:
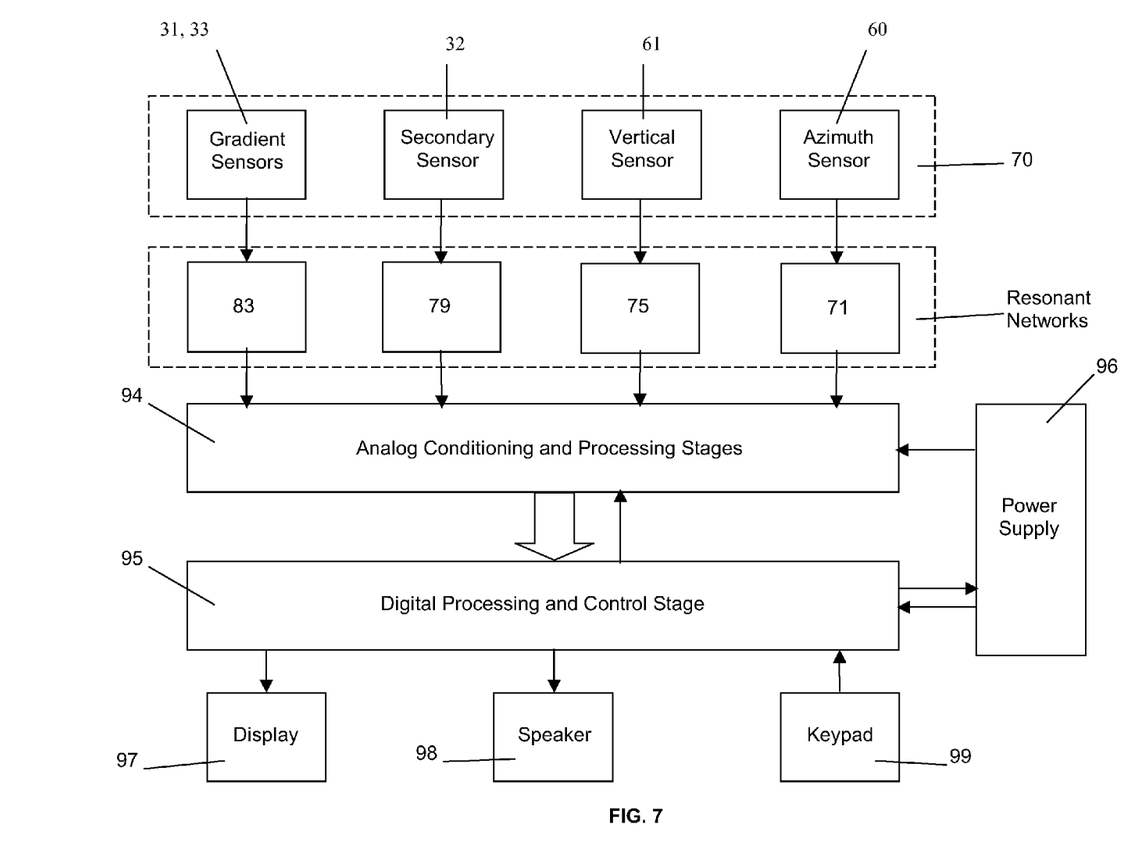
FIG. 7 is a block diagram of one complete system embodiment with additional components of a locator apparatus of the present disclosure.

FIG. 7 illustrates a complete system block diagram of one embodiment of the disclosure. Sensor array 70 of FIG. 5 is shown with associated sensors 31-33, 32, 60 and 61 and connected to resonant networks 83, 79, 71 and 75 respectively, as in FIG. 6. Signals from each resonant network are sent to parallel analog conditioning and processing stage 94 for amplification, filtering, mixing and analog-to-digital conversion. Digitally converted signal data from analog processing stage 94 is sent to digital processing and control stage 95 for further digital processing and indication. In addition to signal processing, digital control and processing stage 95 applies various processing and control signals to power supply 96 and analog processing stage 94, processes user-inputted data from keypad 99 and sends measurement and control information to the user through display 97 and speaker 98. Power supply 96 supplies power to analog processing stage 94 and digital processing stage 95. Display 97 provides the user visual indication of the buried utility's path in transverse and azimuth directions, over-target status, magnetic field strength, estimated magnetic field source current, utility depth and battery status. Speaker 98 provides the user audio information regarding the strength of the magnetic field and proximity to the utility by varying audio amplitude and pitch. Keypad 99 allows the user to turn the locator on and off, adjust audio volume and measurement units.

While illustrated embodiments of the present disclosure have been described herein, many variations of the apparatus exist which do not depart from the scope of the invention. One such variation includes the type of sensors used in the apparatus. Although ferrite core inductive type sensors have been referred to in the illustrative descriptions herein, the present disclosure is not limited to such sensors. Both ferrite core and air core type sensors may be used, as well as any combination of air-core and/or ferrite core type sensors. Other variations of the illustrated embodiments include the exact location of the sensors along the vertical axis 50. Given the variety of performance requirements, sensor properties, space constraints, and costs encountered, a variety of sensor locations may be used without departing from the principles of the present disclosure.

Another variation of the illustrated embodiment often includes sensors for functions unrelated to depth reading. Illustrated examples include the use of sensors that have vertical and azimuth orientated sensors to provide utility direction information.

A further variation includes multifunctional use of the sensors. The use of each sensor contained in the apparatus is not limited to single function usage. For example, the signal from the secondary sensor may also function as a signal strength indicator for utility locating and/or may be used in conjunction with other sensors for various direction indicator functions.

The present invention is not limited to the embodiments and variations described herein, since a multitude of variations are possible to implement by anyone possessing ordinary skill in the art. Therefore, the present examples and descriptions serve to illustrate, not limit the present invention, and the present invention is only limited by the claims appended hereto.

What is claimed is:

1. A locator that uses a direct magnetic field gradient signal and corresponding secondary signal provided by an apparatus to determine the depth of a buried field-emitting utility or subsurface generator, the locator apparatus comprising:
   a first antenna including first and second magnetic field sensors mounted at fixed, spaced apart locations along a vertical axis of the locator, the first and second sensors being configured to provide a direct magnetic field gradient signal indicating a difference of the magnetic fields between first and second sensing locations occupied by the first and second sensors, respectively, along the vertical axis;
   a second antenna having a third magnetic field sensor mounted at a fixed location along the vertical axis of the locator to sense the magnetic field along an axis parallel to the axes of the gradient sensors; the third sensor providing a secondary output signal indicating the magnetic field detected at a sensing location of the third sensor; and
   circuitry coupled to the first and second antennas, the circuitry conditioning, processing, converting signals from the antennas and calculating a depth of the utility based on a minimal error, direct magnetic field gradient signal received from the first antenna and from the secondary output signal received from the second antenna.

2. The apparatus of claim 1, wherein the first, second and third sensors are inductive ferrite core type sensors.

3. The apparatus of claim 1, wherein the first, second and third sensors are inductive air core type sensors.

4. The apparatus of claim 1, wherein the first, second and third sensors are any combination of inductive air core and ferrite core type sensors.

5. The locator apparatus of claim 1, further comprising a vertically aligned sensor and an azimuth sensor both rigidly mounted within the locator along the locator's vertical axis, the vertically aligned sensor sensing vertical field components to provide transversal location information related to the utility and the azimuth sensor sensing magnetic field components perpendicular to both its vertical and horizontal axes to provide azimuth direction information related to the utility, the circuitry being coupled to the vertical and azimuth sensors.

6. The locator apparatus of claim 5, wherein the second antenna also provides a signal strength indicator for the field emitted by the utility.

7. The locator apparatus of claim 1, wherein the second antenna also provides a signal strength indicator for the field emitted by the utility.

8. The locator apparatus of claim 1, wherein the third sensor is located closer to the first sensor than the second sensor.

9. A locator that uses a direct magnetic field gradient signal and corresponding secondary signal provided by an apparatus to determine the depth of a buried field-emitting utility or subsurface generator, the locator apparatus comprising:
   a first antenna including first and second magnetic field sensors mounted at fixed, spaced apart locations along a vertical axis of the locator, the first and second sensors being configured to provide a direct magnetic field gradient signal indicating a directly determined difference between outputs of the first and second sensors;
   a second antenna having a third magnetic field sensor mounted at a fixed location along the vertical axis of the locator to sense the magnetic field along an axis parallel to the axes of the gradient sensors; the third sensor providing an output signal;
   circuitry coupled to the first and second antennas, the circuitry conditioning, processing, converting signals from the antennas and calculating a depth of the utility based on the direct magnetic field gradient signal received from the first antenna and the third sensor output signal received from the second antenna; and
   a vertically aligned sensor mounted within the locator along the locator's vertical axis, the vertically aligned sensor sensing vertical field components to provide transversal location information related to the utility, the circuitry being coupled to the vertically aligned sensor.

10. The locator apparatus of claim 9, wherein the second antenna also provides a signal strength indicator for the field emitted by the utility.

11. The apparatus of claim 9, wherein the first sensor, second sensor, third sensor and the vertically aligned sensor are inductive ferrite core type sensors.

12. The apparatus of claim 9, wherein first sensor, second sensor, third sensor and the vertically aligned sensor are inductive air core type sensors.

13. The apparatus of claim 9, wherein the first sensor, second sensor, third sensor and the vertically aligned sensor are any combination of inductive air core and ferrite core type sensors.

14. The apparatus of claim 9, further comprising an azimuth sensor rigidly mounted within the locator along the locator's vertical axis, the azimuth sensor sensing magnetic field components perpendicular to both its vertical and horizontal axes to provide azimuth direction information related to the utility, the circuitry being coupled to the azimuth sensor.

15. A locator that uses a direct magnetic field gradient signal and corresponding secondary signal provided by an apparatus to determine the depth of a buried field-emitting utility or subsurface generator, the locator apparatus comprising:
   a first antenna including first and second magnetic field sensors mounted at fixed, spaced apart locations along a vertical axis of the locator, the first and second sensors being configured to provide a direct magnetic field gradient signal indicating a directly determined difference between outputs of the first and second sensors;
   a second antenna having a third magnetic field sensor mounted at a fixed location along the vertical axis of the locator to sense the magnetic field along an axis parallel to the axes of the gradient sensors; the third sensor providing an output signal;
   circuitry coupled to the first and second antennas, the circuitry conditioning, processing, converting signals from the antennas and calculating a depth of the utility based on the direct magnetic field gradient signal received from the first antenna and the third sensor output signal received from the second antenna; and
   an azimuth sensor rigidly mounted within the locator along the locator's vertical axis, the azimuth sensor sensing magnetic field components perpendicular to both its vertical and horizontal axes to provide azimuth direction information related to the utility, the circuitry being coupled to the azimuth sensor.

16. The locator apparatus of claim 15, wherein the second antenna also provides a signal strength indicator for the field emitted by the utility.

17. The apparatus of claim 15, wherein the first sensor, second sensor, third sensor and the azimuth sensor are inductive ferrite core type sensors.

18. The apparatus of claim 15, wherein first sensor, second sensor, third sensor and the azimuth sensor are inductive air core type sensors.

19. The apparatus of claim 15, wherein the first sensor, second sensor, third sensor and the azimuth sensor are any combination of inductive air core and ferrite core type sensors.

20. The apparatus of claim 15, further comprising a vertically aligned sensor mounted within the locator along the locator's vertical axis, the vertically aligned sensor sensing vertical field components to provide transversal location information related to the utility, the circuitry being coupled to the vertically aligned sensor.

\* \* \* \* \*